Figure 1:
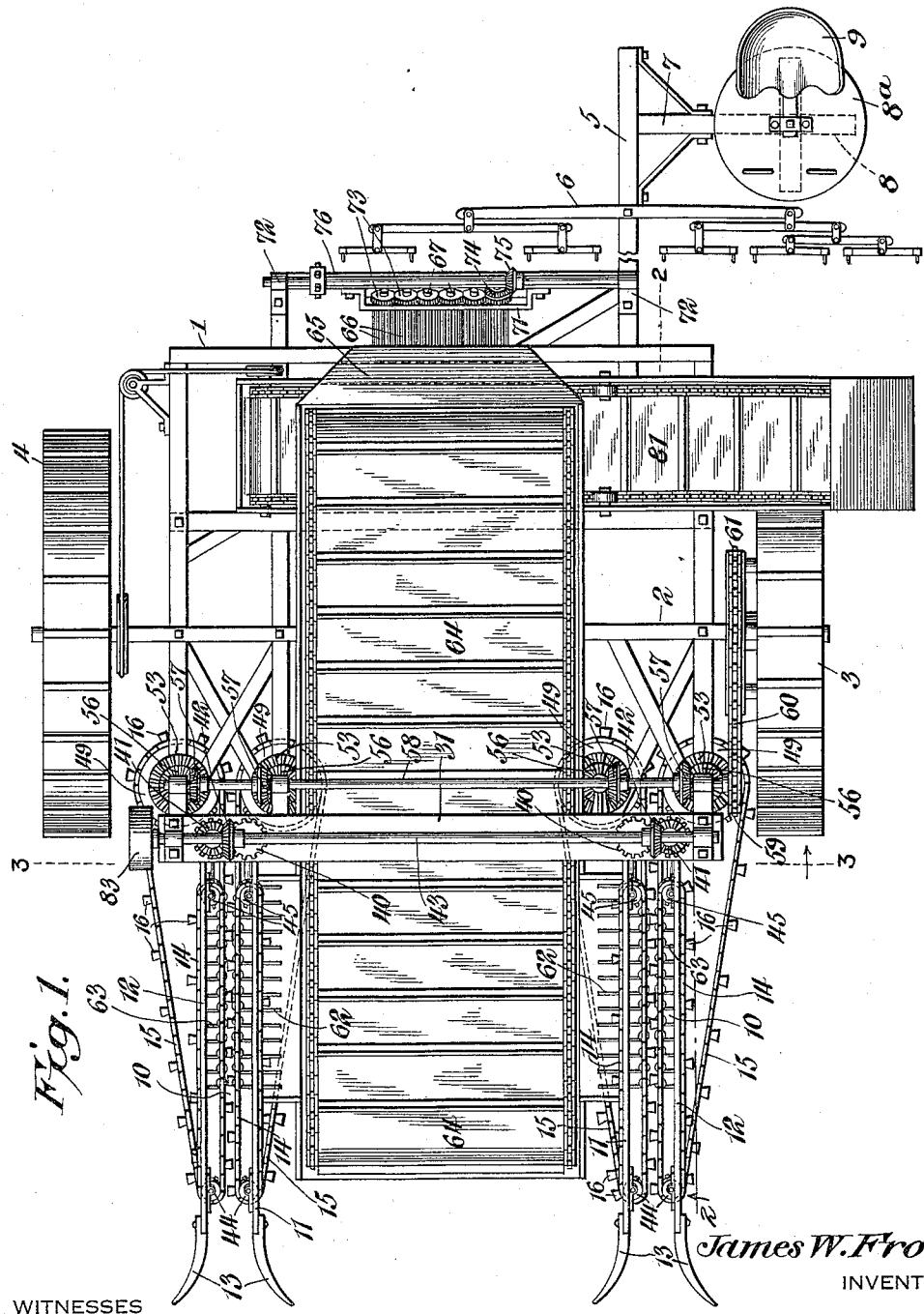

J. W. FROM.
CORN HARVESTER.
APPLICATION FILED DEC. 5, 1914.

1,175,743.

Patented Mar. 14, 1916.
3 SHEETS—SHEET 1.

James W. From,
INVENTOR,

WITNESSES
Howard D. Orr.
H. F. Riley

BY E. G. Siggers
ATTORNEY

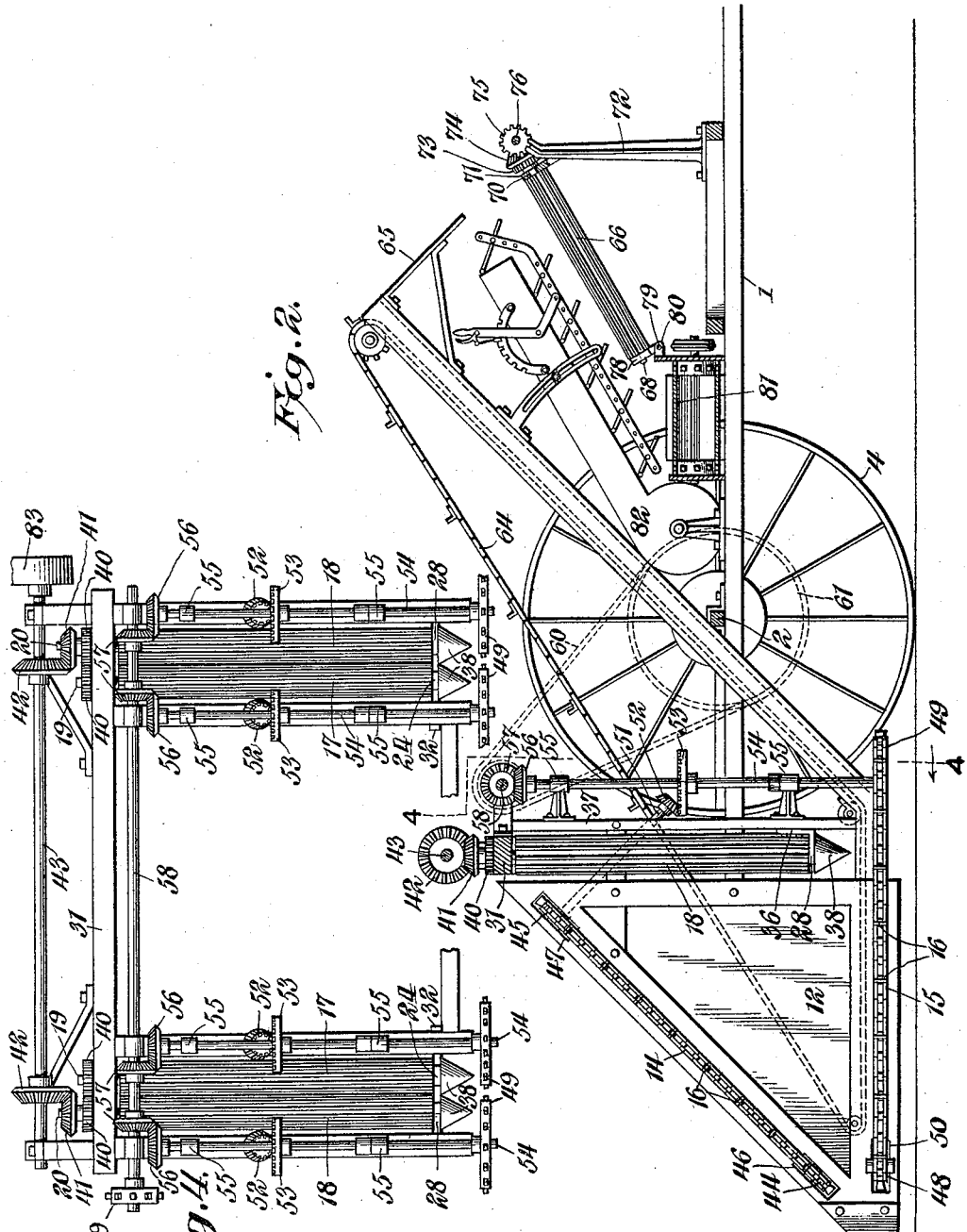

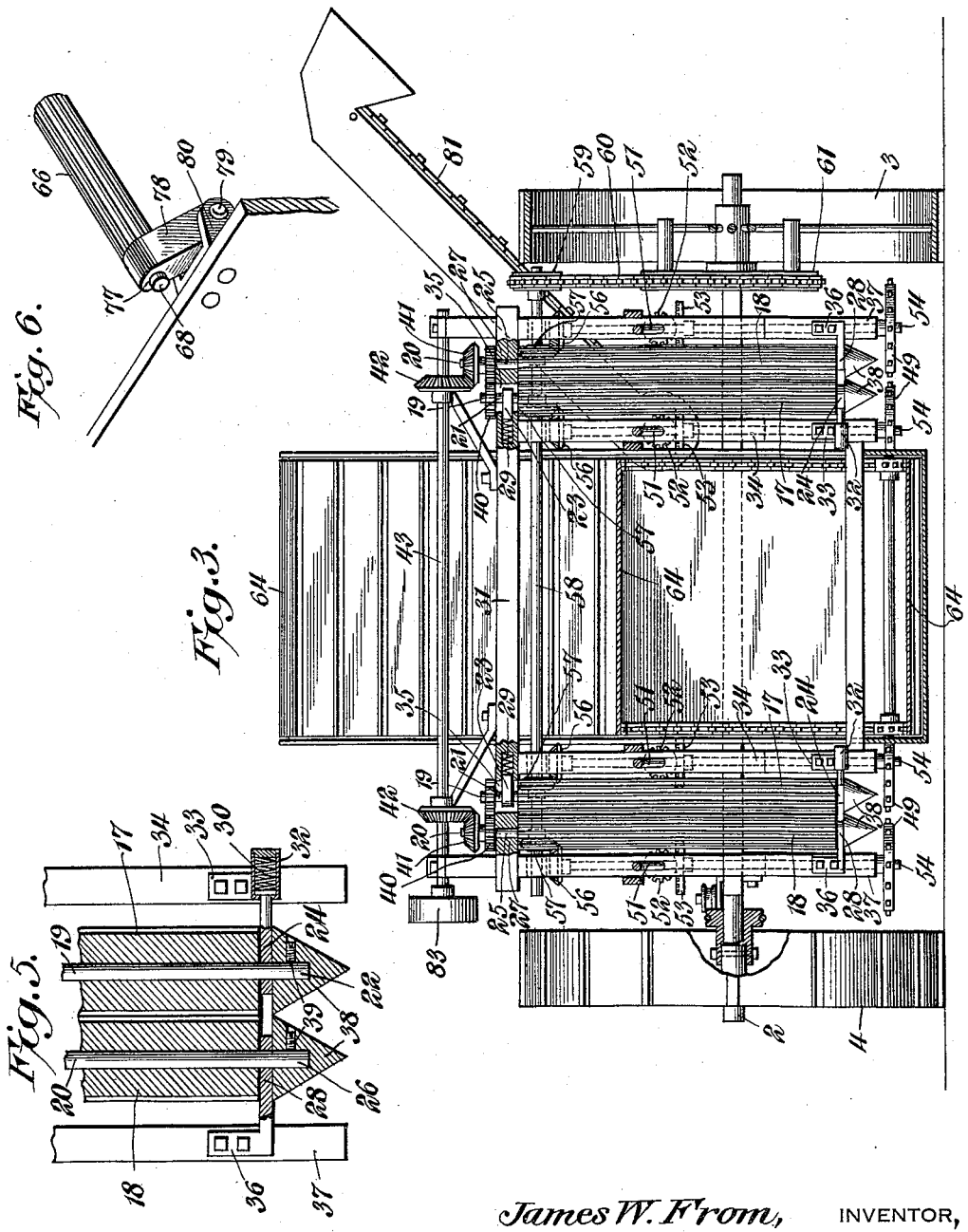

UNITED STATES PATENT OFFICE.

JAMES W. FROM, OF SHELBY, NEBRASKA.

CORN-HARVESTER.

1,175,743.  Specification of Letters Patent.  Patented Mar. 14, 1916.

Application filed December 5, 1914. Serial No. 875,680.

*To all whom it may concern:*

Be it known that I, JAMES W. FROM, a citizen of the United States, residing at Shelby, in the county of Polk and State of Nebraska, have invented a new and useful Corn-Harvester, of which the following is a specification.

The invention relates to improvements in corn harvesters.

The object of the present invention is to improve the construction of corn harvesters, more especially that shown and described in Patents Nos. 942,820 and 1,092,349, granted to me December 7, 1909, and April 7, 1914, respectively, and to enable the feeding mechanism to be actuated by one of the traction wheels independently of the front rolls for stripping and husking the ears, the mechanism for completely husking and cleaning the ears, and the conveyer for carrying the ears from the front rolls to the cleaning mechanism, as well as the front rolls, being actuated by a gasolene engine or other suitable motor.

A further object of the invention is to improve the construction of the front stripping and husking rolls and the manner of mounting the rear husking rolls to enable the latter to be readily arranged at the desired inclination.

With these and other objects in view the invention consists of the construction and novel combination of parts hereinafter fully described, illustrated in the accompanying drawings, and pointed out in the claims appended hereto, it being understood that various changes in the form, proportion, size and minor details of construction, within the scope of the claims, may be resorted to without departing from the spirit or sacrificing any of the advantages of the invention.

In the accompanying drawings:—Figure 1 is a plan view of a corn harvester constructed in accordance with this invention. Fig. 2 is a longitudinal sectional view of the same taken substantially on the line 2—2 of Fig. 1. Fig. 3 is a transverse sectional view taken substantially on the line 3—3 of Fig. 1. Fig. 4 is a transverse sectional view taken substantially on the line 4—4 of Fig. 2, parts being omitted. Fig. 5 is a detail transverse sectional view of the lower portions of one pair of the front rolls. Fig. 6 is a detail perspective view illustrating the manner of mounting the lower ends of the rear husking rolls.

Like numerals of reference designate corresponding parts in all the figures of the drawings.

In the accompanying drawings, in which is illustrated the preferred embodiment of the invention, 1 designates a wheeled frame provided with a suitable axle 2 having journals or spindles for the reception of traction wheels 3 and 4. The frame is provided at one side with a horizontally extending tongue 5, to which is preferably pivoted a five horse draft equalizer 6. The machine is pushed along by the draft animals and the tongue is provided at its rear portion with a laterally extending arm 7 supported at the outer portion by a caster or guide wheel 8, as described in said Patent No. 942,820 and indicated in dotted lines in Fig. 1 of the accompanying drawings. The laterally extending arm 7 supports a platform $8^a$ carrying a seat 9 for the accommodation of the driver, and equipped with foot rests.

The frame is provided at opposite sides with longitudinal passage ways 10 for the corn, formed by vertical inner and outer walls 11 and 12 of substantially triangular form disposed longitudinally of the front and arranged parallel with each other. The inner and outer walls are provided at the front ends of the passage ways with vertically forwardly diverging guides 13 adapted to direct the corn into the longitudinal passage ways 10 of the machine. The vertical walls of the passage ways are suitably connected at their rear edges to the frame of the machine, and the standing corn is carried rearwardly along the passage ways by means of upper inclined feeding chains 14 and also horizontal feeding chains 15, provided at intervals with lugs or projections 16 extending laterally from the sides of the endless chains. The inner flights or stretches of the upper and lower feeding chains are spaced apart to receive the standing corn, and the lugs or projections 16 are of a length to extend nearly across the intervening space between the feeding chains. These lugs or projections positively feed the standing corn to vertical stripping rolls 17 and 18, arranged in pairs and located at the rear ends of the longitudinal passage ways 10.

The vertical rolls 17 and 18, which are corrugated or ribbed, as set forth in the said Patent No. 942,820, are adapted to engage the stalks and husks, whereby the ears are removed from the latter without separating the husks from the stalks. The stalks, with the husks thereon, are left standing in the field, and although the stalks will be more or less broken or crushed, the machine will not uproot the stalks, which are released by the front vertical rolls as soon as they pass through the latter.

The inner and outer rolls 17 and 18 are preferably provided with shafts 19 and 20 having extended terminals forming upper and lower journals. The upper and lower journals 21 and 22 of the inner roll are mounted in slidable bearings 23 and 24, while the upper and lower journals 25 and 26 of the outer vertical roll are journaled in relatively fixed bearings 27 and 28. The inner vertical rolls are yieldably held in engagement with the outer rolls by means of upper and lower coiled springs 29 and 30, which engage the upper and lower slidable bearings 23 and 24 of the inner rolls 17. The upper coiled springs 29 are mounted in sockets of a transverse beam or member 31 of the frame of the machine, and the lower coiled springs 30 are arranged in suitable cylindrical casings 32 having attaching plates or flanges 33 which are suitably secured to the inner vertical bars or members 34 of the frame of the machine. The bar or member 31 is provided at the sockets with slots or openings 35 through which the upper journals 21 of the inner rolls pass, and into which the upper slidable bearings 23 project. The upper bearings 27 for the upper journals 25 of the outer rolls are formed in the terminal portion of the transverse beam or member 31 of the frame, and the lower bearings 28 consist of approximately L-shaped bearing brackets 36 secured to vertical bars or members 37 which are arranged in spaced relation with the inner vertical bars or members 34, as clearly illustrated in Fig. 3 of the drawings. The bearing brackets 36 extend inwardly and are arranged in the same horizontal plane as the lower slidable bearings 24. The lower journals 22 and 26 extend below the lower bearings and have mounted on them conical blocks or sections 38 forming downwardly tapered lower terminals for the stripping rolls and secured to the said lower journals 22 and 26 by set screws 39 or other suitable fastening devices. The set screws, which are mounted in the lower conical blocks or sections, engage the journals 22 and 26 as clearly illustrated in Fig. 5 of the drawings. The upper and lower journals of the inner and outer rolls are connected by intermeshing spur gears 40, and the journals of the outer rolls are extended beyond the spur gearing and are equipped with horizontal bevel pinions 41, which mesh with vertical bevel gears 42 keyed or otherwise secured to a transverse shaft 43. When the transverse shaft 43 is rotated, rotary motion will be imparted to the stripping rolls, which will be simultaneously rotated, the inner contiguous portions of the members of the two pairs of rolls moving rearwardly.

The upper inclined feeding chains are mounted on front and rear sprocket wheels 44 and 45, arranged in front and rear slots 46 and 47 in the walls 11 and 12 of the passage ways. The lower horizontal feeding chains are also mounted on front and rear sprocket wheels 48 and 49, the front sprocket wheels 48 being arranged in horizontal slots 50 in the said walls 11 and 12. The front sprocket wheels of the upper and lower feeding chains are mounted on suitable shafts, which are journaled in bearings at the top and bottom of the slots which receive the front sprocket wheels. The rear sprocket wheels of the upper feeding chains are mounted on inclined shafts 51, journaled in suitable bearings and extending downwardly and rearwardly from the slots 47 to points in rear of the stripping rolls, and equipped at their lower ends with bevel pinions 52 which mesh with crown gears 53 of vertical shafts 54. The vertical shafts 54, which are arranged in pairs at opposite sides of the machine, are journaled in upper and lower bearing brackets 55 secured to and projecting from the vertical bars or members 34 and 37 of the frame of the machine. The rear sprocket wheels 49 of the lower horizontal feeding chains are mounted on the lower ends of the vertical shafts 54 and the latter are provided at their upper ends with horizontal bevel pinions 56 which mesh with vertical bevel pinions 57 keyed or otherwise secured to a horizontally disposed transversely arranged transmission shaft 58 extending across the machine and provided at one end with a sprocket pinion 59. The sprocket pinion 59 is connected by a sprocket chain 60 with a sprocket wheel 61, mounted on and carried by the traction wheel 3 at the left hand side of the corn harvester. When the machine travels forwardly, rotary motion from the traction wheel 3 is transmitted to the upper and lower feeding chains through the said gearing.

The husked ears of corn fall upon resilient fingers 62 and 63, preferably constructed as set forth in the said Patent No. 942,820, and adapted to prevent the ears from dropping upon the ground. The ears of corn are delivered by the said fingers, in the manner explained in the said Patent No. 942,820, to an endless conveyer 64, which carries the ears of corn rearwardly and upwardly and discharges the same upon a downwardly and rearwardly inclined guide plate 65.

The guide plate 65 directs the ears toward and causes them to fall upon a series of inclined corrugated husking rolls 66, arranged in pairs at the back of the machine and having upper and lower journals 67 and 68. The upper journals of the husking rolls are mounted in bearing openings 70 of a transverse bar 71, secured to and supported by opposite standards 72. The upper journals 67 are connected by intermeshing gears 73, and one of the journals, preferably the end one, is extended and provided with a bevel pinion 74 which meshes with a bevel pinion 75 of a rear transverse shaft 76. The lower journals 68 of the rear husking rolls are mounted in bearing openings 77 of inclined bearing blocks 78 mounted at their lower ends on horizontally disposed transversely arranged pivots 79 of bearing brackets 80. The bearing brackets 80 are provided with spaced projecting sides or ears, pierced by the pivots 79, which also pass through the lower ends of the bearing blocks. The pivoted bearing blocks are adapted to be arranged at different angles or inclinations to enable the husking rolls to be set at the desired inclination when building the machine.

The husking rolls extend downwardly and forwardly and are adapted to deliver the ears onto a transversely disposed endless conveyer 81, after the same have been subjected to blasts of air from a fan or blower 82, constructed and arranged as shown and described in the said Patent No. 1,092,349. The ears of corn, after being cleaned of all loose husks and small particles by the husking rolls and the fan or blower are delivered to a wagon or other receptacle by the transverse conveyer.

The mechanism, with the exception of the feeding chains, is designed to be operated by a gasolene engine or other motor, (not shown) with which the stripping and husking rolls, the fan or blower, and the endless conveyer 64 may be connected by any suitable means. The transverse shaft 43 is preferably equipped with a pulley 83, adapted to receive a suitable belt for driving the stripping rolls, but any other suitable means may, of course, be employed for this purpose.

What is claimed is:—

1. A corn harvesting machine including a frame provided with a longitudinal passage way for the standing corn, stripping rolls located at the rear end of the passage way, upper and lower feeding chains extending along the passage way at opposite sides thereof, the upper feeding chains being inclined, vertical shafts located in rear of the stripping rolls and connected at their lower ends with the lower feeding chains, inclined shafts extending downwardly and rearwardly from the upper feeding chains to points intermediate of the ends of the vertical shafts, gearing connecting the inclined shafts with the vertical shafts, means for rotating the said vertical shafts and means for driving the stripping rolls independently of the feeding chains.

2. A corn harvesting machine including a frame provided at opposite sides with passage ways, upper and lower feeding chains located at opposite sides of the passage ways, the upper feeding chains being inclined, vertical shafts arranged in pairs at the said passage ways and provided at their lower ends with sprocket wheels receiving the lower feeding chains, inclined shafts having sprocket wheels at their upper ends to receive the upper inclined feeding chains and extending downwardly and rearwardly therefrom, gearing connecting the lower rear ends of the inclined shafts with the vertical shafts at points intermediate of the ends thereof, a transverse transmission shaft located adjacent to the upper ends of the vertical shafts, gearing connecting the vertical shafts with the transmission shaft, a traction wheel, and means for transmitting motion from the traction wheel to the transmission shaft.

3. A corn harvesting machine including a frame provided at opposite sides with passage ways, stripping rolls located at the rear ends of the passage ways, upper inclined feeding chains terminating short of the stripping rolls, lower horizontal feeding chains extending in rear of the stripping rolls, vertical shafts arranged in pairs in rear of the stripping rolls and provided at their lower ends with sprocket wheels receiving the lower feeding chains, inclined shafts provided at their upper ends with sprocket wheels receiving the inclined feeding chains, said inclined shafts extending downwardly and rearwardly to points in rear of the stripping rolls, gearing connecting the lower ends of the inclined shafts with the vertical shafts, a transversely disposed transmission shaft, gearing connecting the vertical shafts with the transmission shaft, means for actuating the transmission shaft and means for operating the stripping rolls independently of the feeding chains.

4. A corn harvesting machine including a frame provided at opposite sides with passage ways, stripping rolls located at the rear ends of the passage ways, upper inclined feeding chains terminating short of the stripping rolls, lower horizontal feeding chains extending in rear of the stripping rolls, vertical shafts arranged in pairs in rear of the stripping rolls and provided at their lower ends with sprocket wheels receiving the lower feeding chains, inclined shafts provided at their upper ends with sprocket wheels receiving the inclined feeding chains, said inclined shafts extending downwardly and rearwardly to points in rear of the stripping rolls, gearing connecting the lower ends of the inclined shafts with the vertical shafts, a transversely disposed transmission shaft, gearing connecting the vertical shafts with the transmission shaft, a traction wheel, gearing connecting the traction wheel with the transmission shaft and means for operating the stripping rolls independently of the feeding chains.

5. A corn harvesting machine including a frame provided with a longitudinal passage way, stripping rolls located at the rear end of the passage way and provided at their lower ends with projecting journals, bearings receiving the lower journals, and conical sections secured to the lower journals beyond the bearings and forming tapered terminals for the rolls and gearing for causing the rotation of said stripping rolls.

6. A corn harvester comprising a frame having passage-ways, stripping rolls located in a position with respect to said passage-ways to operate on the stalks of corn, upper and lower feeding chains located to traverse along the passage-ways for conducting the stalks of corn to the stripping rolls, vertical shafts arranged in rear of the stripping rolls and provided at their lower ends with sprocket wheels for receiving the lower feeding chains, sprocket wheels for the upper feeding chains, a gearing connection between the sprocket wheels of the upper feeding chains and the vertical shafts, means for actuating the vertical shafts from the wheels of the machine, and gearing applied to the upper ends of the stripping rolls for operating them independently of the feeding chains.

7. A corn harvester comprising a frame having passage-ways, stripping rolls located in a position with respect to said passage-ways to operate on the stalks of corn, upper and lower feeding chains located along the passage-ways for conducting the stalks of corn to the stripping rolls, vertical shafts provided at their lower ends with sprocket wheels for receiving the lower feeding chains, inclined shafts having sprocket wheels at their upper ends for receiving the upper feeding chains, gearing connecting the lower ends of the inclined shafts with the vertical shafts, a transversely disposed transmission shaft, gearing connecting the vertical shafts with the transmission shaft, means for actuating the transmission shaft, and gearing connected to the stripping rolls for operating them independently of the feeding chains.

In testimony, that I claim the foregoing as my own, I have hereto affixed my signature in the presence of two witnesses.

JAMES W. FROM.

Witnesses:
D. C. COLE,
J. M. DUNNING.

Copies of this patent may be obtained for five cents each, by addressing the "Commissioner of Patents, Washington, D. C."